Dec. 24, 1968

I. SIWKO 3,418,540

CONDITION RESPONSIVE CONTROL CIRCUIT WITH
ADJUSTABLE PROPORTIONING BAND

Filed April 11, 1966

INVENTOR.
IRENEUSZ SIWKO
BY
Kenway, Jenney & Hildreth

ATTORNEYS

Dec. 24, 1968     I. SIWKO     3,418,540
CONDITION RESPONSIVE CONTROL CIRCUIT WITH
ADJUSTABLE PROPORTIONING BAND
Filed April 11, 1966     2 Sheets-Sheet 2
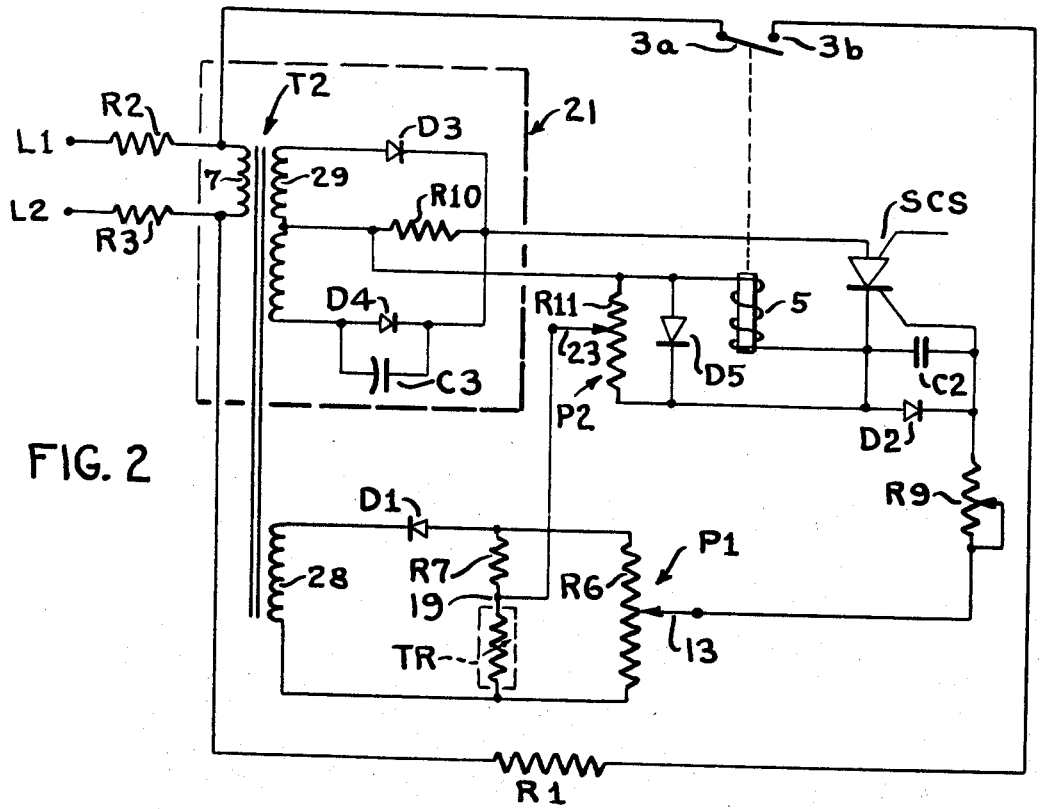
FIG. 2
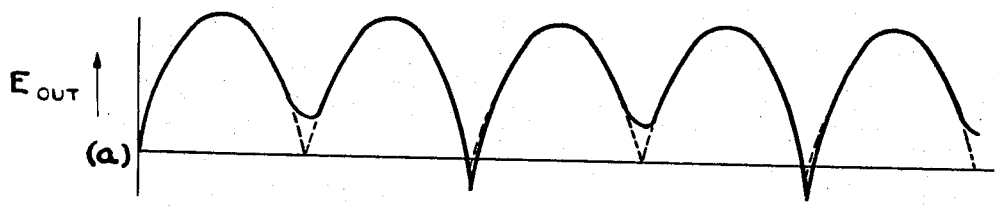
FIG. 3
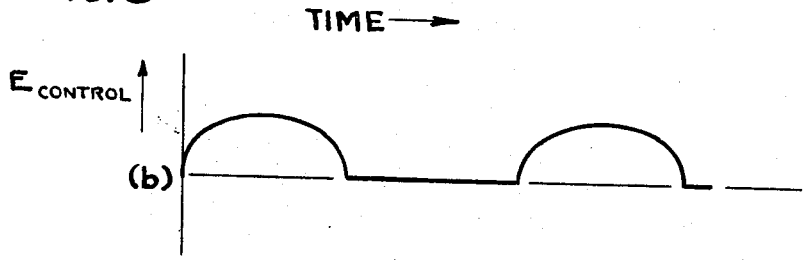
INVENTOR.
IRENEUSZ SIWKO
BY
Kenway, Jenney & Hildreth
ATTORNEYS

United States Patent Office 3,418,540
Patented Dec. 24, 1968

3,418,540
CONDITION RESPONSIVE CONTROL CIRCUIT WITH ADJUSTABLE PROPORTIONING BAND
Ireneusz Siwko, Marlboro, Mass., assignor to Fenwal Incorporated, Ashland, Mass., a corporation of Massachusetts
Continuation-in-part of application Ser. No. 448,218, Apr. 14, 1965. This application Apr. 11, 1966, Ser. No. 541,672
13 Claims. (Cl. 317—153)

ABSTRACT OF THE DISCLOSURE

A relay control circuit including a gate controlled electronic switch connected to supply current to the relay when gated on; a gate control circuit for the switch including a measuring bridge, an impedance connected across the relay winding, and a variable impedance; and a diode coupling the relay energizing circuit to the bridge through the variable resistor to supply heating current to the bridge.

---

My invention relates to control circuits, and particularly to a novel proportioning condition control circuit with a variable proportioning band.

This application is a continuation-in-part of my copending application Ser. No. 448,218 for Relay Control Circuit, filed on Apr. 14, 1965, now abandoned and assigned to the assignee of this application.

Variable conditions, such as temperature, pressure and the like, are commonly controlled by an eletcrically actuated two state device, such as a valve, switch, or the like, capable of being turned on or off at a high rate with respect to the rate of change of the controlled variable. Actuation of the control device may be effected by an amplified error signal produced by comparing a reference signal with a signal produced by means measuring the variable to be controlled. By this arrangement, within a range of values of the controlled variable, it is possible to set the average value of the controlled variable to a desired value by controlling the ratio of "off" time to "on" time of the control device. However, because there is inevitably some delay between the actuation of a control device and the response of the controlled variable, the latter will tend to oscillate about the set point. It is possible to reduce the excursions of the controlled variable by the use of elaborate circuits providing for the introduction of signals corresponding, for example, to the first and higher time derivatives of the controlled variable and to various characteristics of the control device. However, the complexity and cost of such circuits make them impracticable for many purposes. One object of my invention is to simplify the proportional control of a variable with resulting small amplitude of excursions about the set point.

Proportioning controllers of the class here described are characterized by a proportioning band of values of the controlled variable over which the average control effort exerted by the controller is proportional to the value of the controlled variable. The desired value, or set point of the controlled variable, is at the center of this range. The equilibrium value of the controlled variable, within the proportioning band, will, in general, be different from the set point, unless the system is exactly balanced. For example, in a temperature control system for heating a given space with a heater of a given capacity, unless the heater, when on, increases the temperature at the same rate that the temperature is decreased when the heater is off, the equilibrium value of temperature at a given set point will be offset from the set point. If the heater is larger than is necessary for such a balanced system, the equilibrium temperature of control point will be above the set point, and if the heater is smaller than the balanced value, the temperature will be below the set point. The extent of the offset increases with an increase in the width of the proportioning band. Also, the rate at which the system will reach equilibrium when first turned on, and its response to system transients, will be slower if the proportioning band is larger. On the other hand, if the proportioning band is made too small, the system will cycle as an "on-off" system, and the advantage of proportioning control will be lost. Accordingly, it is desired to have as small a proportioning band as possible, while still retaining proportioning control. Since it is obviously quite expensive to design the proportioning band for each controller to fit the particular installation into which it is to be placed, it is highly desirable to be able to vary the proportioning band on a given controller. A second object of my invention is to facilitate the adjustment of the proportioning band of a proportioning controller.

A particular class of control systems to which my invention relates are those in which a power line is used to supply energy to the controlled system and also supplies power for the system control circuit. For example, such a system might include an electrical space heater whose heating elements supply heat to a space, the temperature of which is to be controlled. In such a system, the heating elements are energized by electrical power from a supply line. The supply line is also used to excite a controller which compares the temperature of the heated space with a set temeprature and swtiches the line voltage "on" and "off" at a rate determined by the extent of the departures of the temperature from the set point. Such a system is both economical and reliable, because an additional separate power source for the signal generator is not required. However, such systems are frequently characterized by considerable regulation of the power supply voltage when the line is switched on or off. When the heaters are turned off the voltage rise which occurs will cause an increased error signal causing the heaters to be turned on again and thereby immediately reducing the error signal. The result is very rapid cycling of the switching apparatus until the controlled variable, in this example temperature, is well away from the set point. If the switching device is a relay, the result will be relay chatter, which will rapidly wear out the contacts of the relay. One of the principal objects of my invention is to eliminate the problem of signal voltage regulation in a control circuit excited by a line subject to such regulation.

The apparatus of my invention, by which the above and other objects of my invention may be obtained will be described with respect to specific embodiments thereof especially adapted for use as low cost temperature controllers. Application of the invention to other control problems will be apparent to those skilled in the art. Briefly, a temperature control circuit in accordance with my invention comprises a two-state heater control, such as an electrical relay or the like, provided with contacts for contro!ling the application of energy from an electrical voltage source to heating elements. I provide apparatus for deriving from the supply voltage a source of energizing voltage for the relay, and also for providing electrical energy to energize a signal generator, such as a bridge circuit or the like. The signal generator includes a temperature sensor for producing a signal governed by the temperature of the space to be controlled, and a reference signal generator for setting in a reference signal representing the set point. An electronic switch, such as a silicon controlled rectifier, silicon controlled switch, transistor, or the like, is provided for controlling the application of energizing current to the relay. A control circuit for the electronic switch is provided which is controlled by the signal generator. The electronic switch is or is not rendered conductive depending on whether the temperature is below or above the set point, respectively. In addition to this apparatus, I provide means for producing a signal when current to the relay is interrupted. The sense of this latter signal with respect to the signal produced by the temperature sensing signal generator is such that it reduces that signal and restores current to the relay before its contacts are opened. By this arrangement, the apparatus will allow a larger excursion from the set point before the relay can be de-energized to open its contacts and turn off the heater. Since turning off the heater will in general result in a sharp increase in line voltage, the result will be that, once released, the relay will remain released, because the increased supply voltage to the signal generator due to the increase in line voltage will be compensated by the larger excursion of the control temperature above the set point. As the system cools, the temperature will reach a point at which the signal from the signal generator will be large enough to cause the relay to be picked up. When it does pick up, connecting the line circuit to the load, the voltage will again fall. However, as current to the relay is interrupted from this cause, the additional signal mentioned above will again be produced, tending to produce a net signal causing the relay to remain energized until the system reaches a temperature at which the signal will be in a direction causing the relay to release even after the load has been cut out. By this arrangement, rapid cycling and chattering of the relay is prevented.

In accordance with a preferred embodiment of my invention, I provide a bridge circuit as the signal generator. I also provide means for supplying sufficient current to the bridge when the relay is energized to cause a self-heating action tending to increase the apparent temperature of the system as indicated by the bridge signal. By this arrangement, the relay will be picked up at a temperature very slightly above that at which it will release, and proportioning action can be obtained. By making the amount of current supplied to the bridge circuit for this purpose adjustable, it is possible to change the width of the proportioning band over which proportional control is provided.

Details of the apparatus of my invention, and its mode of operation, will best be understood from the following detailed description, together with the accompanying drawings, of various embodiments thereof.

In the drawings,

FIG. 2 is a schematic wiring diagram of a second embodiment of my invention;

FIG. 3a is an illustration of the wave forms supplied by the power supply used in conjunction with the temperature control of FIG. 2; and FIG. 3b shows the time relationship of the control signal to the power supply voltage to FIG. 3a.

Figure 1:
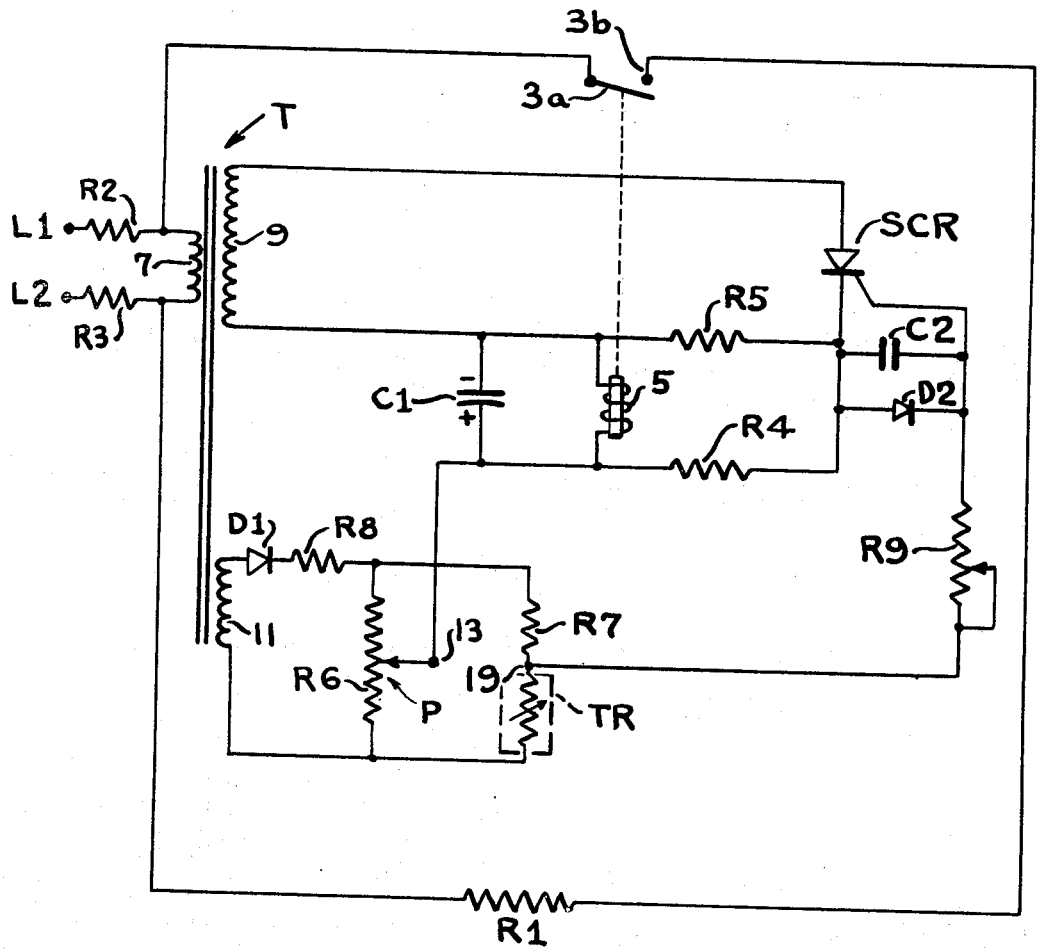
FIG. 1 is a schematic wiring diagram of a temperature control circuit in accordance with the preferred embodiment of my invention.

In FIG. 1 I have illustrated a temperature controller for controlling the application of electrical energy from a power supply here shown schematically as including a pair of line terminals L1 and L2 adapted to be energized by a conventional source of alternating voltage, such as a 110 volt, 60 cycle source. Energy from the source is at times supplied to an electrical heating element, here shown schematically as a resistor R1, through the contacts 3a and 3b of a relay having a winding 5. Resistors R2 and R3 are shown in series with the line terminal L1 and L2 to represent the impedance of the line connecting the terminal of transformer winding 7 and the source, and to imply regulation of the voltage supplied to the controller with load.

To provide voltage of appropriate value for actuating the control circuit of my invention, a transformer T is provided, having a primary winding 7 connected across the line terminals, a first secondary winding 9 and a second secondary winding 11. In one practical embodiment of my invention, the windings 9 and 11 were proportioned to produce 27 volts and 20 volts R.M.S., respectively, across their terminals in response to excitation by a 110 volt line.

An energizing circuit for the relay winding 5 extends from the upper output terminal of the secondary winding 9 of the transformer T through the anode-to-cathode path of a silicon controlled rectifier SCR, a relatively small resistance R4, through the winding 5, and thence back to the lower output terminal of the secondary winding 9. A relatively large resistor R5 is connected across the series combination of the resistor R4 and the winding 5, for purposes to appear. A capacitor C1, of relatively large capacitance, is connected directly across the winding 5. It will be apparent that when the silicon controlled rectifier SCR is gated "on" to supply current to the ralay winding 5, the capacitor C1 will be charged. When the silicon controlled rectifier SCR is subsequently gated "off," the capacitor C1 will tend to prevent the decay of current in the winding 5, thus keeping the relay energized, and at the same time the capacitor will gradually discharge through the series combination of the resistors R4 and R5. Specific illustrative values of the components will be given below, but in general the time constant of the circuit should be selected to be several cycles of the alternating source connected to the line terminals L1 and L2.

A gate control circuit for the controlled rectifier SCR extends between its cathode and its gate terminal. One component of this control circuit is a signal generator comprising a bridge excited by the secondary winding 11 of the transformer T. The bridge comprises a potentiometer P having a wiper 13 adjustably engaging a resistive element R6. The element R6 is connected across the series combination of a fixed resistor R7 and a thermistor TR, adapted to be placed in a space whose temperature is to be monitored. The supply terminals 15 and 17 of the bridge thus formed are energized by the winding 11 connected in series with a diode D1 and a resistor R8. Diode D1 rectifies the supply voltage and acts as a phase discriminator to permit production of a bridge signal only during half cycles of the supply voltage during which the anode of the silicon controlled rectifier SCR is positive with respect to its cathode. The diode D1 also effectively reduces the average current flowing in the bridge, thus avoiding unwanted self-heating effects that would increase the temperature differential within which the controller can effectively maintain the temperature of the monitored space.

The output signal of the bridge is produced between the wiper 13 and a terminal 19 at the junction of the resistor R7 and the thermistor TR. These terminals are connected in series with the resistor R4 and a variable resistor R9 between the cathode of the silicon controlled rectifier SCR and its gate terminal. A capacitor C2 and a diode D2 are each directly connected between the cathode and gate terminal of the controlled rectifier SCR. The capacitor C2 is provided to prevent circuit transients from falsely gating the controlled rectifier SCR either "on" or "off," and the diode D2 serves to prevent a large reverse gating voltage from being applied to the controlled rectifier SCR.

While various values of the components can be used, as will be apparent to those skilled in the art, in one practical embodiment of my invention, with the values of voltages given above, the resistor R4 was 50 ohms, the resistor R5 was 5,000 ohms, the resistor R6 was 2,000 ohms, the resistor R7 was 620 ohms, the resistor R8 was 620 ohms, and the variable resistor R9 had a maximum value of 2,000 ohms. The capacitor C1 had a capacitance of 50 microfarads rated at 25 volts, and the capacitor C2 was .01 microfarad. The thermistor TR would be selected to have a value equal to the value of the resistor R7 at the temperature selected as the set point with the wiper 13 in the middle of the resistor R6.

The operation of the apparatus of FIG. 1 will now be described, on the assumption that line voltage has just been applied to the terminals L1 and L2 and that the temperature of the system is well below the set point. Under these conditions, the resistance of the thermistor TR will be higher than that of the resistor R7, and a positive signal will appear between the terminals 19 and 13 tending to gate the controlled rectifier SCR into conduction. This signal will be produced during the first half cycle in which the anode of the controlled rectifier SCR is positive with respect to its cathode. As the controlled rectifier SCR is gated into conduction, current will flow through the resistor R4 and through the winding 5 of the relay in parallel with the capacitor C1. The charging time of the capacitor C1 will be relatively short with respect to its discharge time, as it is charged through the small resistor R4 and discharged through the resistor R4 in series with the larger resistor R5. Thus, with the constants given above, the charging time constant will be substantially less than a half cycle of the alternating voltage applied to the source.

The relay will be energized closing its contacts 3a and 3b, very shortly after the power is applied to the input terminals. When the contacts 3a and 3b are closed, current will be supplied to the load resistor R1, and the line voltage will normally drop. However, when the system is cold, the bridge signal will be relatively large, and this voltage drop will have no immediate effect.

During half cycles in which the controlled rectifier SCR is cut off because its cathode-to-anode voltage is in the wrong direction, the capacitor C1 will hold up the voltage across the relay winding 5 and will also discharge through the resistors R4 and R5. It will be apparent that during the discharge of the capacitor C1 a voltage component will be produced across the resistor R4 in the sense tending to gate the controlled rectifier SCR into conduction. However, so long as the controlled temperature is not near the set point, this voltage will have no substantial effect.

Each time the controlled rectifier SCR is forward-biased with respect to its anode and cathode and is gated into conduction, a voltage will appear across the resistance R4, having a maximum value of about 10 volts for the component values given above. This voltage will cause current to flow through the path comprising the diode D2 and the variable resistor R9, and through the bridge resistances including the thermistor TR. The current through the thermistor TR will tend to heat it and thus reduce its resistance, simulating a higher temperature in the heated space. That effect will also be unimportant unless the bridge is very nearly balanced.

After the relay has been energized for a sufficient time to cause the temperature to reach a point near the set point, the bridge signal will nearly be balanced. At this time, the self-heating current flowing while the controlled rectifier is conducting will heat the thermistor and cause the bridge signal to go to zero at a temperature lower than the set point. At such times, the voltage produced across the resistor R4 while the capacitor C1 is discharging will produce a signal component in the opposite sense, tending to cause the controlled rectifier to be gated "on."

It will be seen that the self-heating current tending to make the apparent temperature higher when the relay is energized will flow only during portions of positive half-cycles of the source voltage during which the controlled rectifier SCR is conducting, and that the compensating signal for line voltage drop will be produced only during negative-going half-cycles of the source and those portions of the positive-going half cycles during which the voltage across the secondary winding 9 is below the voltage across the capacitor C1. However, the heat produced by self-heating current produces a higher average thermistor temperature and a corresponding gate signal which is effective during the period in which the controlled rectifiers SCR can be gated on. As noted above, the self-heating current will cause the bridge signal to go to zero before the temperature reaches the set point. However, the signal tending to gate the controlled rectifier SCR "on" that is produced across the resistor R4 when the capacitor C1 is discharging will hold the controlled rectifier into conduction until the temperature has moved sufficiently above the set point so that when the relay is released the resulting increase in line and bridge voltage will not cause the relay to be picked up again. After the relay is released, no self-heating current will flow, and the voltage component across the resistor R4 will become smaller and smaller as the capacitor C1 discharges.

When the temperature falls below the set point, the action just described will be repeated, and a proportioning control action will be obtained. The width of the proportioning band can be adjusted by adjusting the value of the resistance R9. The control circuit can accordingly be adjusted to various installations without redesign.

The rate at which the system cycles as a result of current flow through the thermistor TR, as described above, may be adjusted by using sensors of different thermal masses. Thus, a glass bead thermistor, for example, has a small thermal mass and results in relatively rapid cycling. If a rod thermistor, which has a larger thermal mass than the glass bead thermistor, is used as a sensor, the system will cycle at a relatively slower rate.

FIG. 2 shows a second embodiment of the temperature control circuit of my invention, in which parts corresponding in structure and function to those in the embodiment of FIG. 1 are given corresponding reference numerals. As shown, the circuit includes a power supply, comprising that portion of the apparatus within the dotted rectangle generally indicated at 21. The power supply illustrated in FIG. 2 is described in detail in the copending application of Lyman H. Walbridge, filed Jan. 27, 1964, Ser. No. 340,436, entitled "Rectifying and Wave Shaping Circuit," said application also being assigned to the assignee of this application. Accordingly, only a brief description of its construction and operation in given herein.

As can readily be seen from an inspection of the power supply, it is a conventional full wave rectifier circuit having a capacitor C3 connected in parallel with one of the diodes D4. Additionally, a resistor R10 is connected in parallel with the power supply load. As is more fully explained in the co-pending application mentioned above, the effect of the capacitor C3 and resistor R10 is to modify the output waveform from that of a conventional full wave rectified waveform to the waveform shown in FIG. 3a.

As there illustrated, the output voltage does not go to zero after every half-cycle of the input voltage. Rather, it alternately remains at a positive value to ensure that a controlled electronic switch supplied by it will remain conducting, and alternately reverses polarity for a very short period to extinguish the controlled electronic switch.

In the circuit illustrated in FIG. 2, I provide a silicon controlled switch SCS connected in series with the coil 5 of a relay. The series combination of switch and relay coil is connected to the output terminals of the power supply 21.

The circuit for generating the control signals to control the switch SCS is a bridge circuit including as one leg thereof a resistor R7 and a temperature sensitive resistor, such as a thermistor TR. The other leg of the bridge is formed by the portions of the resistance R6 included on either side of the movable arm 13 of a potentiometer P1. The balance point of the bridge, and therefore the "set point" of the controller, may be adjusted by moving the movable arm 13 of the potentiometer P1.

Bridge excitation is supplied from the secondary winding 28 of a transformer T2 which is also used for the power supply 21. A diode D1 provides a rectified voltage having a half sinusoidal waveform (illustrated in FIG. 3b) as excitation to the bridge. The diode is included for the reasons described above in connection with FIG. 1.

The bridge output signal is connected via the wiper 13 and the terminal 19 to the relay control circuit including the silicon controlled switch SCS and the relay winding 5. In addition to these components, the relay control circuit also includes a diode D5 and a potentiometer P2, both being connected in parallel with the relay coil 5. The control signal for the gate circuit of the switch SCS is the voltage appearing between the movable arm 23 of the potentiometer P2 and the cathode of diode D5 plus the bridge unbalance signal appearing between the terminal 19 and the movable arm 13 of the potentiometer P1. This total voltage is applied to the gate terminal of the switch SCS via the variable resistor R9. A capacitor C2 and a diode D2 are connected between the resistor R9 and the cathode of the switch SCS for the same purposes described in connection with FIG. 1. The heating element R1 is connected to the line terminals L1 and L2 over the contacts 3a and 3b of the relay.

For purposes of explaining the operation of the circuit of FIG. 2, it will be assumed that the temperature of the space to be controlled is well below the desired temperature at the time the controller begins operation. Under these conditions, the bridge will be completely unbalanced and a large signal will appear during each half cycle of applied voltage between the cathode and the gate terminal of the switch SCS. Since a positive voltage is applied between anode and cathode of the switch SCS from the power supply at the same time, the switch will operate and cause the relay to close the contacts 3a and 3b, thus supplying power to the heating element R1. The closing of the contacts 3a and 3b will reduce the voltage across the primary of the transformer T2 and therefore the bridge output. Also, during the conduction of the switch SCS self-heating current will flow in the bridge, causing the resistance of the thermistor TR to decrease and produce a small signal component indicating a slightly higher temperature than the thermistor is actually exposed to. However, the bridge is sufficiently unbalanced so that neither the drop in the bridge voltage nor the increased temperature signal will affect circuit operation at this time.

As explained in greater detail in the co-pending application mentioned above, once each cycle the anode voltage applied to the switch SCS reverses polarity and current through the switch is extinguished. However, the switch will again be turned on during the next half cycle, if the control voltage is sufficiently great. This momentary interruption of current through the relay does not cause relay drop-out, however, as will be explained below.

The current to the coil 5 of the relay is interrupted once each cycle when the silicon controlled switch SCS ceases conduction. This current interruption results in a transient voltage appearing across the coil 5 of the relay as the magnetic field surrounding the coil collapses. Current flows through the diode D5 and the voltage across the diode D5 also appears across the resistance element R11 of the potentiometer P2. A portion of the latter voltage, depending upon the setting of the movable arm 23 of the potentiometer, is added in series with the unbalance voltage from the bridge and applied to the gate terminal of the switch SCS. The sum of this transient voltage appearing across diode D5 and the voltage resulting from bridge unbalance causes the switch SCS to begin conduction during the next cycle of positive voltage from the power supply. Since the collapse of the field of coil 5 is relatively rapid and precedes the time when the contacts 3a and 3b open, current through the coil is re-established before the contacts actually open and power is continuously supplied to the load R1 until the temperature of the controlled space reaches a value above which the line voltage change produced by opening the relay contacts will not cause chattering. As discussed above in connection with the embodiment of FIG. 1, as the set temperature is closely approached and the bridge nears balance, the signal component introduced by self-heating current flowing in the bridge will cause the bridge to balance at a slightly lower actual temperature than that of the monitored space, and hence produce anticipation.

When the temperature reaches the proper value, the combination of the bridge signal and the voltage resulting from the interruption of current through the relay coil 5 is insufficient to cause conduction of switch 18 and the contacts 3a and 3b open, removing power from the heating element R1. With the load of the heating element removed, the voltage at the primary terminals of transformer T2 rises, thus increasing the control signal from the bridge. However, the absence of the signal produced by the potentiometer P2 will prevent the switch SCS from closing until th temperature drops below the release value and the bridge unbalance causes it to operate.

The action when the controlled temperature drops below the desired temperature as a result of cooling is similar. Thus, as the temperature drops, the bridge signal becomes sufficiently large to cause switch SCS to fire. When it does so, the relay operates, closing the contacts 3a and 3b and energizing the heating element R1. Because of the loading of the primary power line by the heating element the control voltage from the bridge circuit drops. This drop in voltage might be enough to permit the switch SCS to cease conduction at the end of the next cycle of operation. However, the presence of the transient voltage at the end of each half cycle of operation ensures that the contacts 3a and 3b remain closed until the temperature is again raised to the desired value.

Thus, the effect of adding a portion of the transient voltage appearing across the relay coil 5 to the bridge output signal is to cause the controller to supply energy to the heating element for a longer period during the heating portion of the control cycle than it otherwise would. When the heating element is unenergized the added voltage causes the circuit to begin the heating cycle at the time at which the bridge output signal just reaches a value sufficient to fire the controlled electronic switch SCS. The difference in temperature between these two extremes is the so-called "differential," i.e., it is the temperature extremes between which the controller causes the controlled temperature to cycle. It is apparent from the foregoing discussion that adjustment of the amount of the voltage appearing across resistor R11 which is added to the controller voltage will determine this thermal differential. Thus, by adjusting the movable arm 23 of the potentiometer P2, one can adjust the thermal differential of the controller as well as prevent chattering of the relay as described above.

The diode D5 functions to limit the amplitude of the transient voltage appearing across the coil 5 of the relay, and thereby protects the switch SCS from being subjected to excessive back voltage. The diode D5 conducts heavily when current through the coil 5 of the relay is interrupted. Since the voltage across the diode D5 (or a portion of it) is the voltage used to prevent chattering, I prefer to use a diode having a voltage drop which is relatively large when conducting e.g. a silicon diode. This ensures that there will be adequate voltage to add to the bridge voltage to ensure chatter-free operation.

While I have described my circuit in connection with a non-linear amplifier, a controlled electronic switch, it is to be understood that it is equally useful with conventional linear amplifiers, i.e., transistors or vacuum tubes. Further, although I have described my improved circuit in connection with a temperature controller, it is to be understood that it is equally useful for controlling other variables, such as pressure, torque flow rate and the like.

It will thus be seen that the objects set forth above, among those made apparent from thep receding description, are efficiently attained and, since certain changes may be made in the construction without departing from the scope of the invention, it is intended that all manner contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A circuit for controlling the electrical power supplied from a source of electrical energy to a load in response to changes in a measured variable whose magnitude is affected by the power supplied to said load comprising, in combination: measuring means comprising a bridge circuit energized from said source and having output terminals providing an electrical signal whose magnitude is dependent upon the departure of said variable from a predetermined set point; a relay having a coil and a set of contacts, means including an electronic switch device having load terminals connecting the coil of said relay to a source of voltage, said switch device having a control terminal to cause said device to become conducting upon application of an appropriate signal thereto, means causing said switch device to become periodically non-conducting, means connecting the output terminals of said bridge circuit to the control terminal of said switch device; means supplying at least a portion of the voltage appearing across said relay coil when said switch device is rendered non-conducting to the control terminal of said switch device, a diode and a variable resistor connected in series between the coil and the bridge circuit, said diode being poled to supply heating current to the bridge when energizing current is supplied to said coil, and means including said relay contacts for connecting said source of electrical energy to said load.

2. In a control circuit, a relay having a winding and contacts closed when the winding is energized, a capacitor connected across said winding, first and second impedances connected in series with each other and in parallel with said winding, a pair of input terminals adapted to be excited by alternating voltage and a unidirectionally conducting electronic switch having a control terminal and having load terminals connected in series with said second impedance and said input terminals, said switch being conducting between its load terminals when current of a predetermined polarity is supplied to its control terminal with respect to a first of its load terminals, and the voltage across said input terminals is of a predetermined polarity, a diode connected between said control terminal and said first load terminal and poled to pass current of a polarity opposite said predetermined polarity, and a switch control circuit connected between said control terminal and said first load terminal, said switch control circuit comprising, in series, said first impedance, a bridge circuit including a temperature responsive resistor, said bridge circuit being balanced at a predetermined value of temperature to be measured and unbalanced to produce an error signal at other temperatures, said switch being poled such that when conducting current energizing said winding and charging said capacitor, current is supplied to said bridge circuit to heat said temperature responsive resistor and thereby unbalance the bridge to produce a signal representing a temperature higher than the actual value, and when said switch ceases to conduct, a voltage is produced across said first impedance tending to provide current to the control terminal of said switch with said predetermined polarity.

3. The apparatus of claim 2, further comprising a variable resistor connected in series with said first impedance and said bridge to control the amount of heating current supplied to the bridge circuit.

4. In a control circuit, a relay having a winding and contacts closed when the winding is energized, a pair of input terminals adapted to be excited by alternating voltage and a unidirectionally conducting electronic switch having a control terminal and having load terminals connected in series with said winding and said input terminals, said switch being conducting between its load terminals when current of a predetermined polarity is supplied to its control terminal with respect to a first of its load terminals, and the voltage across said circuit terminals is of a predetermined polarity, a diode connected between said control terminal and said first load terminal and poled to pass current of a polarity opposite said predetermined polarity, and a switch control circuit connected between said control terminal and said first load terminal, said switch control circuit comprising a bridge circuit including a temperature responsive resistor, said bridge circuit being balanced at a predetermined value of temperature to be measured and unbalanced to produce an error signal at other temperatures, said switch being poled such that when conducting current energizing said winding, current is supplied to said bridge circuit to heat said temperature responsive resistor and thereby unbalance the bridge to produce a signal representing a temperature higher than the actual value.

5. The apparatus of claim 2, further comprising a variable resistor connected in series with said bridge circuit to control the amount of heating current supplied to the bridge circuit.

6. The apparatus of claim 4, further comprising an impedance connected in parallel with said winding, and means connecting a portion of said impedance in series with said bridge to produce a signal component of the proper polarity to make said switch conducting when the voltage across said input terminals is not of said predetermined polarity and said winding has been energized.

7. The apparatus of claim 6, in which said impedance comprises a diode and a resistive potential divider each connected in parallel with said winding.

8. The apparatus of claim 6, in which said impedance comprises a capacitor and a resistive potential divider each connected in parallel with said winding.

9. The apparatus of claim 5, further comprising an impedance connected in parallel with said winding, and means connecting a portion of said impedance in series with said bridge to produce a signal component of the proper polarity to make said switch conducting when the voltage across said input terminals is not of said predetermined polarity and said winding has been energized.

10. The apparatus of claim 9, in which said impedance comprises a diode and a resistive potential divider each connected in parallel with said winding.

11. The apparatus of claim 9, in which said impedance comprises a capacitor and a resistive potential divider each connected in parallel with said winding.

12. A circuit for controlling the electrical power supplied from a source of electrical energy to a load in response to changes in a measured variable whose magnitude is affected by the power supplied to said load comprising, in combination, measuring means energized from said source and providing an electrical signal whose magnitude is dependant upon the departure of said variable from a predetermined set point, a relay having a coil and a set of contacts, means including an electronic switch device connecting the coil of said relay to a source of voltage, said switch device having a control terminal to cause said switch device to become conducting upon application of an appropriate signal thereto, means causing said switch device to become periodically non-conducting, means connecting said electrical signal from said measuring means to the control terminal of said switch device, a diode and a resistive element of a potentiometer each connected in parallel across said relay coil, means connecting the movable arm of said potentiometer to the control terminal of said switch device to supply a portion of the voltage appearing across said relay coil when said switch device is rendered non-conducting to the control terminal of said switch device, and means including said relay contacts for connecting said sourec of electrical energy to said load.

13. A circuit for controlling the electrical power supplied from a source of electrical energy to a load in response to changes in a measured variable whose magnitude is affected by the power supplied to said load comprising, in combination, measuring means energized from said source and providing an electrical signal whose magnitude is dependant upon the departure of said variable from a predetermined set point, a relay having a coil and a set of contacts, means including an electronic switch device connecting the coil of said relay to a source of voltage, said switch device having a control terminal to cause said switch device to become conducting upon application of an appropriate signal thereto, means causing said switch device to become periodically non-conducting, means connecting said electrical signal from said measuring means to the control terminal of said switch device, a capacitor and a resistive potential divider each connected in parallel with said winding, means connecting said potential divider to said control terminal to supply to said control terminal a portion of the voltage appearing across said relay coil when said switch device is rendered non-conducting, and means including said relay contacts for connecting said source of electrical energy to said load.

References Cited

UNITED STATES PATENTS

| | | |
|---|---|---|
| 2,777,640 | 1/1957 | Kaufman. |
| 2,938,100 | 5/1960 | Gibbs. |
| 3,040,156 | 6/1962 | McGlaughlin. |
| 3,354,358 | 11/1967 | Bray et al. _____ 317—153 X |

JOHN F. COUCH, *Primary Examiner.*

J. A. SILVERMAN, *Assistant Examiner.*

U.S. Cl. X.R.

317—132, 148.5